April 22, 1952  A. BRAY  2,593,972
LUBRICATOR
Filed Nov. 18, 1948

Inventor
ARTHUR BRAY
By Henry N. Young
Attorney

Patented Apr. 22, 1952

2,593,972

UNITED STATES PATENT OFFICE 2,593,972

LUBRICATOR

Arthur Bray, Sacramento, Calif.

Application November 18, 1948, Serial No. 60,654

5 Claims. (Cl. 184—45)

This invention relates to a pressure-discharge lubricator of the pressure-gun charging type having a self-contained grease chamber or reservoir.

An object of the invention is the provision of a lubricator of the class described which is automatically operative to maintain a supply of lubricant at the point of use in a particularly simple and effective manner.

A more specific object of the invention is the provision of an improved lubricator having a discharge piston operative in its reservoir in a particularly efficient manner.

The invention possesses other objects and features of advantage, some of which, with the foregoing, will be set forth or be apparent in the following descrption of a typical embodiment thereof and in the accompanying drawings, in which, Figure 1 is a partly sectional elevation of an operatively mounted lubricator embodying my features of invention.

Figure 1:
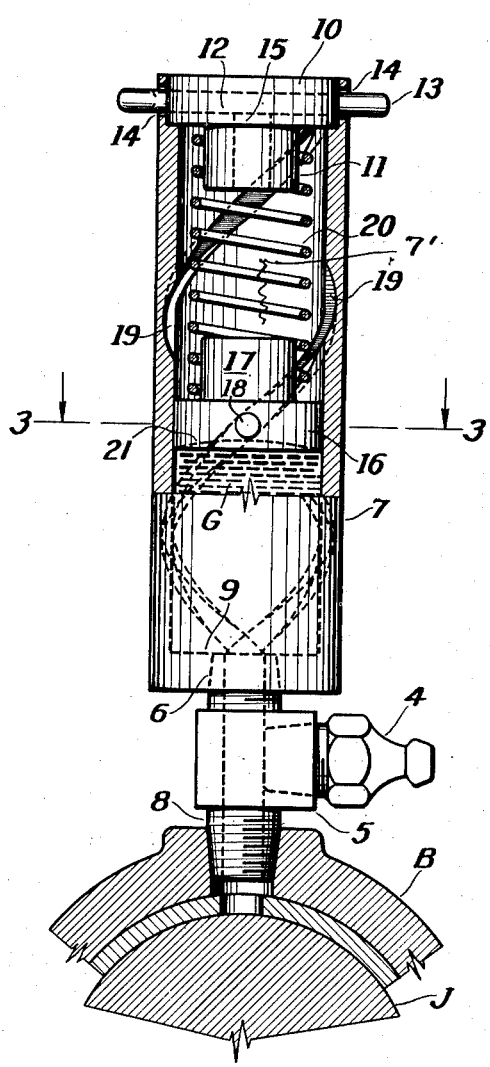
Figure 2:
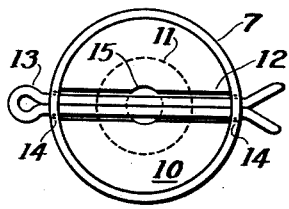
Figure 2 is a plan view of the lubricator of Figure 1.
Figure 3:
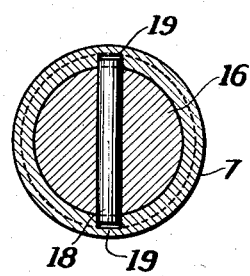
Figure 3 is a section taken on the line 3—3 of Figure 1.

Referring to the drawings, the present form of my lubricator comprises a pressure fitting 4 of the usual check valve type; an adaptor 5 in the form of a T fitting having a female threaded inlet connection receiving the fitting 4 and male threaded connections 6 and 8; and a grease receptacle 7 engaged by the connection 6. Figure 1 illustrates a typical application wherein the lubricator assembly is shown as supportedly installed on a bearing cap B by means of its connection 8 for feeding grease to a journal J through a greasing duct provided by the cap.

The receptacle 7 is of hollow cylindrical form having an end wall 9 drilled and tapped to receive the connection 6 of the adaptor 5. The head or open end of the receptacle bore is preferably counterbored to slidably receive a cylindrical head plug 10 which is formed with a concentric spring-centering boss 11 extending from its inner face. A diametrical groove 12, cut in and across the outer face of the plug 10 is adapted to receive a cotter pin 13, which, passing through aligned holes 14 in the tubular wall of the receptacle 7 adjacent the open end thereof, serves to secure the plug for its ready removal if cleaning of the receptacle cavity is required. A centrally located aperture 15 through the plug 10 serves as a vent to prevent an air lock in the top of the cavity 7' of the receptacle.

A cylindrical plunger 16 having a concentric spring-locating boss 17 on its upper side, and complementary to the boss 11, is slidably and closely engaged as a floating piston in the cylinder bore of the receptacle 7. A pin 18, passing diametrically through and from the plunger 16 is adapted to have its projecting ends slidably and closely engage a pair of equi-pitched helical cylinder grooves 19 of relatively large lead, whereby a rotary motion is arranged to be imparted to the plunger 16 during and by reason of reciprocative movements thereof. A helical compression spring 20, which is centered by the opposing head and plunger bosses 11 and 17 in spaced relation from the side of the cavity 7' exerts a continuous resilient pressure acting to urge the plunger 16 toward the connection end of the receptacle 7, for the expulsion of lubricant from the receptacle end to the associated bearing, the plunger assembly so fitting the receptacle bore that little lubricant, if any, may escape along the plunger by reason of the spring-provided pressure therein. For a reason hereinafter brought out, the lubricant-contacting face 21 of the plunger 16 is preferably of concave form.

Lubricant grease is supplied to the lubricator in the usual manner by means of a pressure gun (not shown) applied to the valved fitting 4. Grease entering the adaptor 5 flows from its passage through the connections 8 and 6 to respectively form a lubricant film around the journal J and to enter the reservoir chamber 7'. The charging pressure, overcoming the relatively weaker action of the spring 20, urges the plunger 16 toward the head end of the chamber 7, allowing the reservoir-charging entry of the grease into the chamber cavity 7' until the plug boss 17 engages the head boss 11. As the film of lubricant around the journal J becomes depleted during service, the spring-pressed plunger 16 forces more lubricant through the adaptor and into the bearing, thus automatically insuring an adquate bearing lubrication as long as the chamber cavity 7' contains grease; the present lubricator is, of course, rechargeable while in use.

With particular reference to the grease-discharging action of the plunger 16, it is important to note that the turning action of the plunger as it follows the lead of the helical grooves 19, aided by the concave shape of its grease-contacting end face 21, insures a complete and effective discharge of the chamber's contents by progressively breaking the adhesion of the grease to the chamber bore by a scraping action of the leading rim of the plunger against the grease at the bore face. It is also to be noted that the present arrangement having the ends of the pin 18 guidedly engaged by the sides of the grooves 19 broadly comprises a high-pitched threaded engagement of the plunger in the chamber bore, and may be so considered and referred to.

From the foregoing description, taken in connection with accompanying drawings, the advantages of the present lubricator will be readily understood by those skilled in the art to which the invention appertains. While I have described the principle of operation, together with an arrangement which I now consider to be a preferred embodiment thereof, I desire to have it understood that the showings are primarily illustrative, and that such changes and developments may be made, when desired, as fall within the scope of the following claims.

I claim:

1. In a lubricator, a receptacle providing a cylindrical chamber having a common intake and discharge opening for a lubricant at one end, a head member removably fixed at the other end of the chamber and providing a spring seat directed toward the first end of the chamber, a free plunger reciprocable in said chamber in direct threaded engagement with its side, and a helical compression spring constantly operative between said spring seat and the plunger, for moving the plunger toward the opening, the threaded engagement of the plunger and the chamber side being operative for rotating the plunger by reason of its longitudinal movement in the chamber.

2. In a lubricator of the character described, a receptacle providing a cylindrical chamber having a common intake and discharge opening for a lubricant at one end, an axially imperforate free plunger reciprocable in said chamber in direct threaded and sealed relation to its side and arranged to receive a charge of lubricant between it and said opening, and means constantly operative against the plunger to urge it toward said opening, the threaded engagement of the plunger and chamber side being operative to rotate the plunger about its axis solely by reason of its movement in the chamber under the influence of said means.

3. In a constant-feed lubricator unit, a receptacle providing a cylindrical chamber arranged for a lubricant intake and discharge at the same end thereof, a plunger reciprocable in said chamber in direct threaded engagement with the side of the chamber bore for its rotation by reason of its longitudinal movement in the chamber bore, and a spring means constantly and yieldingly reactive between the plunger and receptacle to urge a lubricant-ejecting movement of the plunger in the chamber bore.

4. A structure in accordance with claim 3 having the threaded engagement of the plunger with the cylinder provided by a helical groove in the chamber side complementarily and slidably receiving a radial projection of the plunger while the balance of the chamber side closely receives the plunger.

5. A structure in accordance with claim 3 having the threaded engagement of the plunger with the cylinder provided by a plurality of relatively high-pitch helical grooves in the chamber side complementarily and simultaneously receiving radial projections of the plunger in sliding engagement therewith.

ARTHUR BRAY.

REFERENCES CITED

The following references are of record in the file of this patent:

UNITED STATES PATENTS

| Number | Name | Date |
| --- | --- | --- |
| 1,292,692 | Boyer | Jan. 28, 1919 |
| 1,685,404 | Johnson | Sept. 25, 1928 |